(12) United States Patent
Lee et al.

(10) Patent No.: US 8,041,828 B2
(45) Date of Patent: Oct. 18, 2011

(54) METHOD AND SYSTEM FOR DISTRIBUTED STREAMING SERVICE OF PORTABLE DEVICES

(75) Inventors: Kwang-Jeung Lee, Suwon-si (KR); Kyung-Chun Moon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 340 days.

(21) Appl. No.: 12/328,303

(22) Filed: Dec. 4, 2008

(65) Prior Publication Data

US 2009/0150558 A1    Jun. 11, 2009

(51) Int. Cl.
*G06F 15/16* (2006.01)

(52) U.S. Cl. ........ 709/231; 709/208; 709/211; 709/217; 709/219

(58) Field of Classification Search .................... 709/231
See application file for complete search history.

(56) References Cited

U.S. PATENT DOCUMENTS

| | | | |
|---|---|---|---|
| 2003/0145038 A1* | 7/2003 | Bin Tariq et al. | 709/202 |
| 2004/0192342 A1* | 9/2004 | Ranganathan | 455/456.1 |
| 2006/0015904 A1* | 1/2006 | Marcus | 725/46 |
| 2006/0143420 A1* | 6/2006 | Van Gassel et al. | 711/170 |
| 2008/0109556 A1* | 5/2008 | Karlberg | 709/231 |
| 2008/0165906 A1* | 7/2008 | Ho et al. | 375/354 |
| 2008/0320396 A1* | 12/2008 | Mizrachi et al. | 715/744 |
| 2009/0063419 A1* | 3/2009 | Nurminen et al. | 707/3 |
| 2009/0307367 A1* | 12/2009 | Gigliotti | 709/231 |
| 2010/0165872 A1* | 7/2010 | Jiang | 370/253 |

* cited by examiner

*Primary Examiner* — Phuoc Nguyen
*Assistant Examiner* — Adam Cooney
(74) *Attorney, Agent, or Firm* — The Farrell Law Firm, P.C.

(57) ABSTRACT

A method and a system for a distributed streaming service of portable devices forming a short-distance communication network. A buffer size and a priority of each of the portable devices are determined according to their remaining memory capacity, respectively. Each portable device calculates a buffering time using the buffer size and the priority, and receives sub-contents, corresponding to the buffering time, of a streaming content from a streaming server. A master device of the portable devices plays the sub-contents by acquiring them from the other portable devices.

19 Claims, 5 Drawing Sheets

METHOD AND SYSTEM FOR DISTRIBUTED STREAMING SERVICE OF PORTABLE DEVICES

PRIORITY

This application claims priority to an application entitled "METHOD AND SYSTEM FOR DISTRIBUTED STREAMING SERVICE OF PORTABLE DEVICES" filed in the Korean Intellectual Property Office on Dec. 6, 2007, and assigned Serial No. 2007-0126014, the contents of which are incorporated herein by reference.

BACKGROUND OF THE INVENTION

1. Field of the Invention

The present invention relates generally to a streaming service for portable devices and, more particularly, to distributed streaming service for portable devices belonging to a service group in a short-distance communication network, enabling each portable device to receive, based on its remaining memory capacity, parts of streaming contents from a streaming server, and enabling a master device of portable devices to play contents by acquiring sub-contents from the other portable devices in a service group.

2. Description of the Related Art

Many Internet users do not have fast enough access to the Internet to quickly download large multimedia files. Streaming is a technique for delivering web-based multimedia files such as video, audio, animation, etc., so that these files can be processed as a steady and continuous stream at the requesting client. A streaming service provides a multimedia content to Internet users, without the users having to wait until content completely downloads to their memory devices. Through caching, content is played as it is received, and buffering mechanisms ensure that content is played smoothly.

Theoretically, a streaming content plays to the end user, or viewer, as an immediate and ongoing broadcast. Practically, a small-sized content such as audio realizes a real-time delivery and play because this content does not require a large bandwidth and a large memory. However, large-sized content, such as video, is often affected by the state of a delivery network or the performance of end user devices. Further, receiving and playing video with high density (or high definition) utilizes a faster data-transmission network and a higher performance device.

When streaming service for portable devices, a mobile communication network has a relatively smaller bandwidth, and most portable devices have a relatively lower performance. Therefore, it is difficult for portable devices to receive and play a high quality video in real-time without a break in displaying the video.

BRIEF SUMMARY OF THE INVENTION

The present invention has been designed to solve the above and other problems occurring in the prior art, and provides a method and a system for a distributed streaming service of portable devices that belong to a service group in a short-distance communication network, enabling each portable device to receive, based on its remaining memory capacity, parts of streaming contents from a streaming server, and enabling a master device of portable devices to play contents by acquiring sub-contents from the other portable devices in a service group.

In accordance with an aspect of the present invention, a method is provided for a distributed streaming service of portable devices including a master device and slave devices. The method includes determining a buffer size and a priority of each portable device at the master device, being based on a remaining memory capacity of each portable device; calculating a buffering time of each portable device, being based on the buffer size and the priority; receiving sub-contents of a streaming content at the portable devices, the streaming content being transmitted from a streaming server, wherein each portable device receives separately different sub-contents at the buffering time; and playing the sub-contents continuously at the master device.

In accordance with another aspect of the present invention, a system is provided for a distributed streaming service. The system includes a plurality of portable devices establishing a short-distance communication network, each portable device calculating a buffering time from a buffer size and a priority determined depending on a remaining memory capacity thereof, and each portable device buffering different sub-contents of a streaming content for the buffering time; and a streaming server transmitting separately the sub-contents of the streaming content to each portable device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the present invention. Hereinafter, well-known configurations and processes may be not described or illustrated in detail to avoid obscuring the essence of the present invention.

Streaming data may be video data or audio data. Most current portable devices are capable of using streaming data. In the embodiments of the present invention described below, an apparatus for playing a streaming data is embedded in the portable devices.

In order to play streaming data, a portable device may include several function modules such as an analog-to-digital converter (ADC), a CODEC, and a color converter. An ADC converts analog signals into digital signals suitable for a display unit that displays streaming data. A CODEC compresses or decompresses the streaming data depending on its format, and a color converter reduces or extends the streaming data in order to meet a screen size of a portable device. In addition a portable device may include any kind of controllers for controlling function modules or storages.

A portable device used in the present invention may be a mobile communication terminal, a digital broadcasting terminal, a Personal Digital Assistant (PDA), a smart phone, or a 3G terminal such as an International Mobile Telecommunication 2000 (IMT-2000) terminal, a Wideband Code Division Multiple Access (WCDMA) terminal, or a Universal Mobile Telecommunication Service (UMTS) terminal. Alternatively, a portable device may be a multimedia device such as a game console, a Consumer Electronics (CE) device, an MP3 player, a digital camera, a set top box, a personal computer, or any other suitable devices.

In the present invention, a portable device acts as a master device or a slave device according to a remaining memory capacity. Accordingly, hereinafter, a portable device may be often referred to as a master device or a slave device.

Streaming content that a streaming server transmits may be content selected by a portable device or real-time broadcast content. Sub-contents are parts of the streaming content that each portable device receives and temporarily stores in its buffer.

Figure 1:
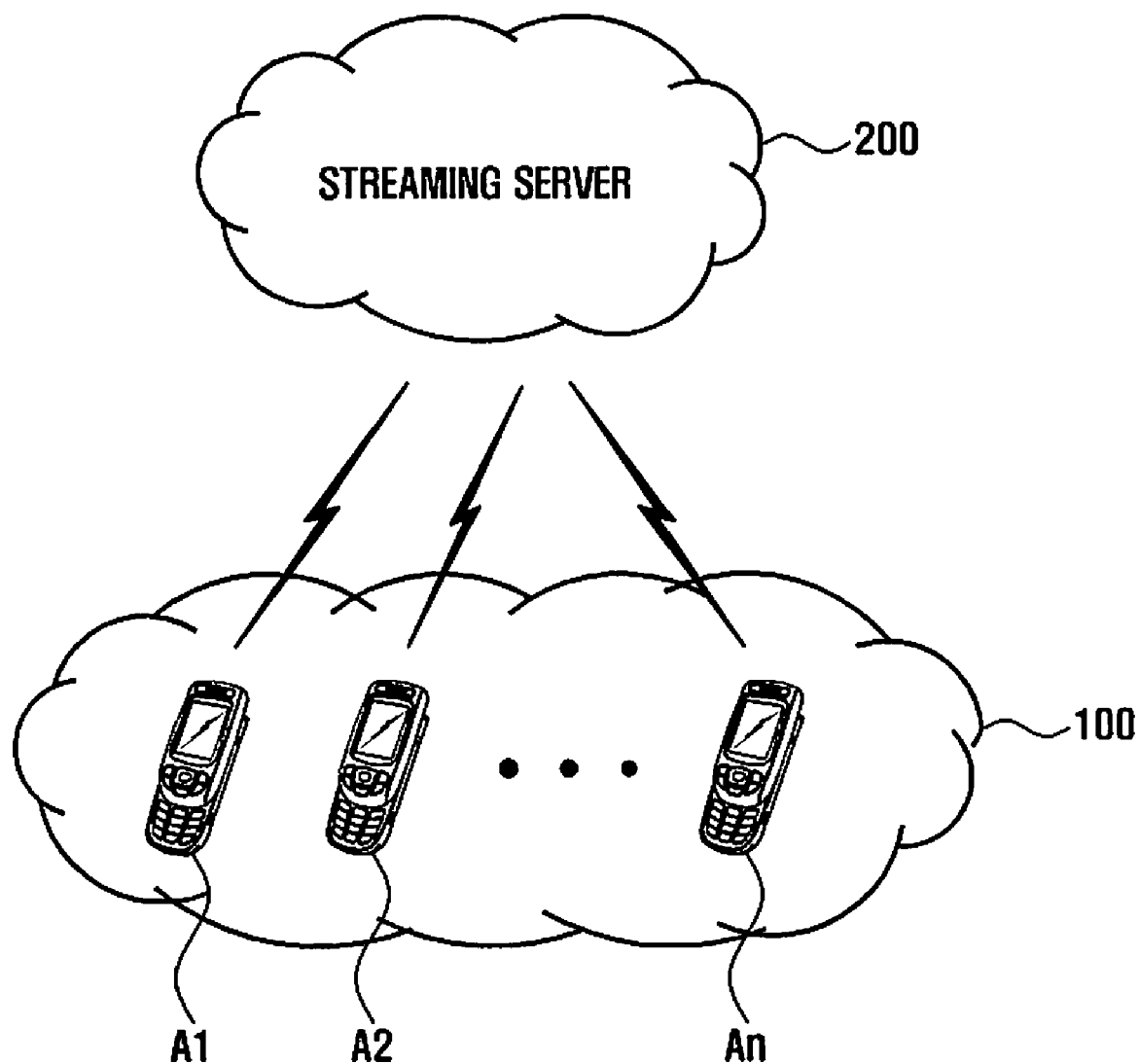
FIG. 1 illustrates a system for a distributed streaming service in accordance with an embodiment of the present invention.

FIG. 1 illustrates a system for a distributed streaming service in accordance with an embodiment of the present invention.

Referring to FIG. 1, a system that provides a distributed streaming service includes a service group 100 and a streaming server 200. The service group 100 includes a plurality of portable devices A1, A2, . . . , An, and the streaming server 200 transmits streaming contents to the service group 100.

The portable devices A1, A2, . . . , An in the service group 100 are available for a distributed streaming service and also make up a short-distance communication network. More specifically, each portable device sends information about its remaining memory capacity to the other portable devices through a short-distance communication network and receives information about respective remaining memory capacities from the other portable devices. Based on individual remaining memory capacities, a portable device with the highest remaining memory capacity is designated as a master device A1. The other portable devices are designated as slave devices A2, . . . , An. The master device assigns a priority and a buffer size to each of the slave devices, depending on their remaining memory capacities. That is, the master device assigns a higher priority to the slave device with a higher remaining memory capacity.

If the streaming content is very large or a real-time broadcast, each portable device A1, A2, . . . , An in the service group 100 may repeatedly use its buffer with a limited size to continuously receive sub-contents. For example, if streaming content with one hour play time is transmitted to three portable devices with different buffer sizes corresponding to 10-second, 5-second, and 3-second in play time, respectively, the streaming content is divided into sub-contents that meet buffer sizes of three portable devices. That is, the one hour play time of the streaming content is divided into 10-second play time, 5-second play time, 3-second play time, 10-second play time, 5-second play time, etc., and each of three portable devices receives continuously receives corresponding divided parts of the streaming content, i.e., the sub-contents. A configuration of the portable devices in the service group 100 and the assignment of streaming content will be described in more detail with reference to FIGS. 2 and 3.

The streaming server 200 stores a great variety of contents and offers them to the portable devices A1, A2, . . . , An using a streaming technique.

Figure 2:
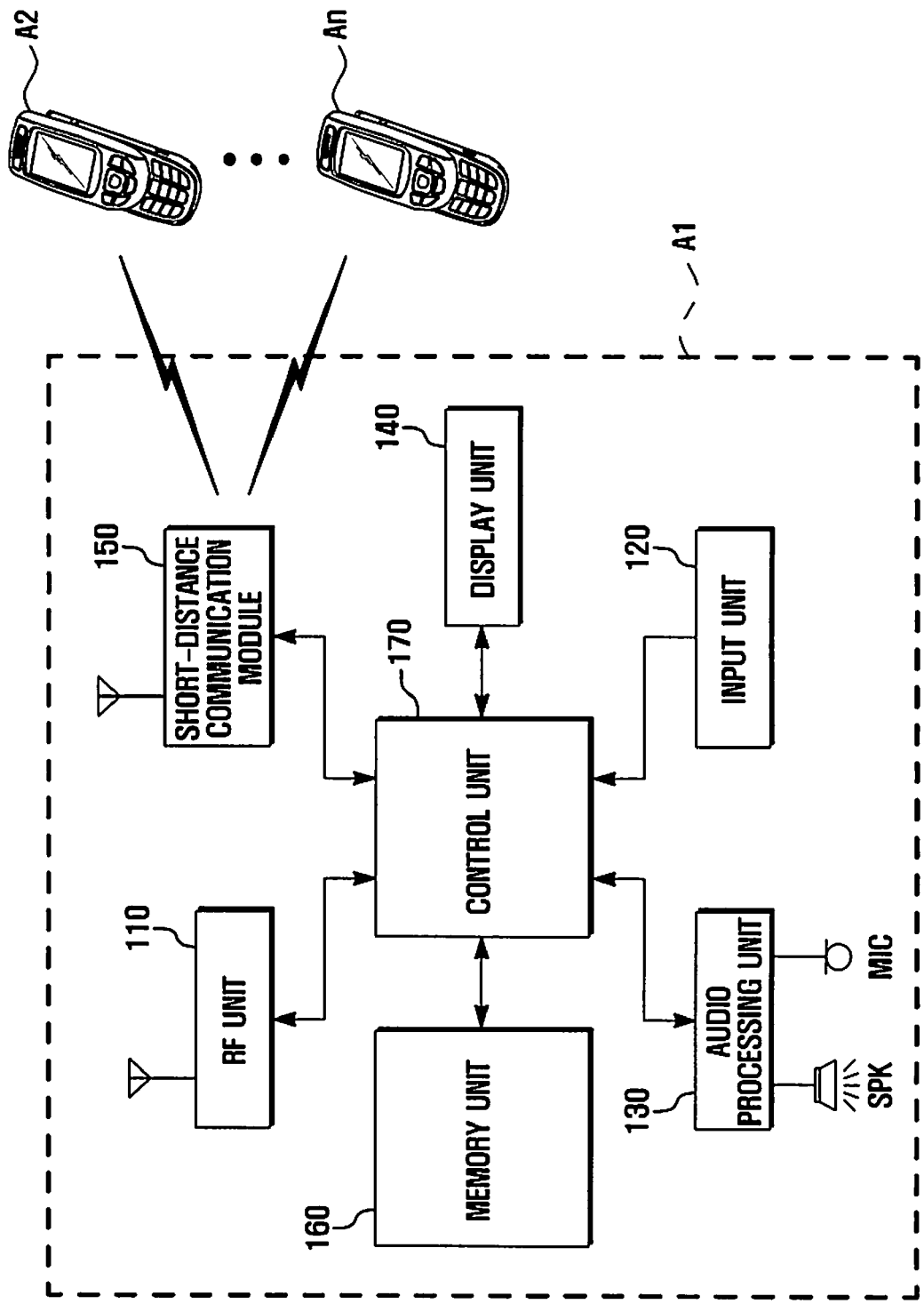
FIG. 2 is a block diagram illustrating a configuration of a portable device in accordance with an embodiment of the present invention.

FIG. 2 is a block diagram illustrating a configuration of a portable device in accordance with an embodiment of the present invention.

Referring to FIG. 2, a portable device A1 is a master device among the portable devices in the service group. Each of the other portable devices A2, . . . , An, i.e., each slave device, may have the same configuration as the master device or at least may be very similar in configuration to the master device.

The portable device A1, A2, . . . , An may include a Radio Frequency (RF) unit 110, an input unit 120, an audio processing unit 130, a display unit 140, a short-distance communication module 150, a memory unit 160, and a control unit 170. The RF unit 110 is included in the portable device if the portable device has a wireless communication function. The RF unit 110 sends and receives voice call or message under the control of the control unit 170. For the above function, the RF unit 110 may include an RF transmitter that up-converts the frequency of transmission signals and amplifies the signals, and an RF receiver that low-noise amplifies reception signals and down-converts the frequency of the signals.

Particularly, the RF unit 110 establishes a communication channel with the streaming server 200 under the control of the control unit 170. In addition, the RF unit 110 may receive sub-contents of a streaming content the streaming server 200 transmits. Herein, the RF unit 110 starts receiving the sub-contents at timing calculated in consideration of buffer size. More specifically, a buffering time, i.e., a temporarily storing time span, of each portable device is determined in view of its own buffer size and the buffer sizes of the other portable devices. For example, if the master device, the first slave device, and the second slave device have 3-second buffer size (that is, a remaining memory capacity available for playing a streaming content for 3 seconds), 2-second buffer size, 1-second buffer size, respectively, the three devices start to receive simultaneously and separately respective sub-contents while buffering them in their own buffers. The master device receives and plays the first sub-contents to 3 seconds from the start, and then receives other sub-contents from the slave devices after playing the first sub-contents. The first slave device receives the second sub-contents to 2 seconds from the start and then delivers them to the master device from 3 seconds to 5 seconds, so the first slave device buffers the received sub-contents for 3 seconds. That is, the buffering time of the first slave device is 3 seconds. Similarly, the second slave device receives the third sub-contents to 1 second from the start and then delivers them to the master device from 5 seconds to 6 seconds, so the buffering time of the second slave device is 5 seconds. Accordingly, through the RF unit 110, all the portable devices can receive their own individual sub-contents.

The input unit 120 includes, for example, alphanumeric keys and function keys arranged for efficient data entry. Preferably, the function keys include navigation keys, side keys, shortcut keys, and other kinds of specific keys. The input unit 120 creates key input signals related to function controls of the master device and sends them to the control unit 170.

The input unit 120 creates input signals for a distributed streaming service of the present invention and sends them to the control unit 170. The input signals may include signals for a user's selection of a menu or options in a streaming service, signals for the establishment of a short-distance communication channel to another device, signals for a play or a control of received sub-contents, etc.

The audio processing unit 130 includes a speaker (SPK) and a microphone (MIC). The speaker outputs audio signals received during a play of audio files stored in a memory or during a voice call. The microphone obtains a sound including a user's voice to send it to another device. Particularly, the audio processing unit 130 outputs audio signals in the sub-contents when the master device plays the sub-contents.

The display unit 140 offers a variety of images on a screen. For example, the display unit 140 provides graphical user interfaces such as a standby screen, hierarchical menu screens, a call screen, etc. The display unit 140 may include a Liquid Crystal Display (LCD) device or other alternative display devices. The display unit 140 may be formed of a touch-screen, which performs also parts or all of functions of the input unit 120.

Particularly, the display unit 140 for a distributed streaming service provides a menu screen for selecting and playing a streaming content, a screen for representing a process of establishing short-distance communication channels between the master device and the slave devices, a screen for showing a list of the slave devices in the master device, a screen for forming communication channels among the master device, the slave devices, and the streaming server, and a screen for showing a reception of sub-contents from the streaming server. These graphical user interfaces will be described below with the control unit 170.

The short-distance communication module 150 establishes short-distance communication channels between the master device and the slave devices. The short-distance communication module 150 may be a Bluetooth module, an InfraRed Data Association (IRDA) module, a Zigbee module, etc.

After establishing short-distance communication channels between the portable devices in a service group, the short-distance communication module 150 sends a remaining memory capacity of its own device to the other devices and receives remaining memory capacities of the other devices. Preferably, a certain portable device, even though not the master device, which enables a distributed streaming service before other devices, collects remaining memory capacities of the other devices. Thereafter, the collecting device compares the remaining memory capacities, including its own remaining memory capacity, with each other. Based on the comparison results, the collecting device designates a portable device with the highest remaining memory capacity as a master device. Also, the collecting device transfers a control right of a short-distance communication network to the master device.

The memory unit 160 stores a great variety of application programs including specific application programs required for operation of a distributed streaming service. More specifically, application programs stored in the memory unit 160 include an application program for enabling a short-distance communication module, an application program for playing a received streaming content, an application program for accessing the streaming server, and a protocol, such as Real-Time Streaming Protocol (RTSP), available for downloading a streaming content in real-time from the streaming server. Additionally, any other application programs may be used in connection with optional functions of the portable device, such as a camera function, an audio replay function, etc.

Particularly, the memory unit 160 may act as a buffer while the respective portable devices receive sub-contents from the streaming server. The memory unit 160 may include a separate a program region and a data region.

The program region stores an Operating System (OS) for booting the portable device, various application programs required for a distributed streaming service, a message service application program for processing messages, and other optional application programs such as an audio replay function, an image, or video replay function, a mobile broadcast reception function, etc. When a user requests to enable one of the available functions, the program region offers the requested function using the corresponding application program under the control of the control unit 170. A distributed streaming service may require specific application programs for enabling a short-distance communication module, for receiving sub-contents from the streaming server, and for playing sub-contents, and a protocol for receiving a streaming content.

The data region stores data created according to the use of the portable device. More specifically, the data region may store video data, audio data, phonebook data, metadata related to contents, and any other user-related data. The data region may store data on remaining memory capacities of the respective slave devices, and data on buffer sizes created in view of the respective remaining memory capacities. Additionally, the data region may temporarily store sub-contents received from the streaming server. The data region of the master device may also temporarily store sub-contents the slave devices deliver, and then transmit them to the display unit 140 under the control of the control unit 170. A detailed description about sub-contents will be made below with reference to FIG. 3.

The control unit 170 controls the general operation of the portable device and the signal flow between internal circuit blocks of the device. Particularly, the control unit 170 controls the signal flow between elements required for a distributed streaming service, the reception of sub-contents from the streaming server, and the delivery of sub-contents from the slave devices to the master device.

More specifically, the control unit 170 enables the display unit 140 to display a menu of options available to a user requesting a distributed streaming service. Additionally, the control unit 170 enables the RF unit 110 to access the streaming server 200 when the input unit 120 sends input signals of a user request for playing a streaming content in a distributed streaming service. For access to the streaming server 200, the control unit 170 may control a web browser to display web pages the streaming server 200 provides. When receiving input signals of selecting a specific streaming content included in a web page, the control unit 170 may transmit the selection signal to the streaming server 200 and receive information about the selected content, such as content size, transmission property, content summary, etc.

Portable devices using a distributed streaming service may perform a process for gathering other devices, which participate together in receiving a streaming content, before accessing the streaming server 200. That is, the control unit 170 of a specific portable device may enable the short-distance communication module ISO before accessing the streaming server 200 and obtaining information about target content. Through the enabled short-distance communication module 150, the control unit 170 performs a pairing process with the other portable devices in a short-distance communication network. Then the control unit 170 requests and receives data on remaining memory capacities of the other portable devices, and arranges the received data on remaining memory capacities in order of size. Thereafter, the control unit 170 designates a portable device with the highest remaining memory capacity as a master device, transfers a control right of a short-distance communication network to the master device, and sends received data on remaining memory capacities to the master device. The control unit 170 of the master device determines a buffer size and a priority of each slave device, based on respective remaining memory capacities, and sends the determined buffer sizes and priorities to the respective slave devices.

The control unit 170 of each slave device may calculate its own buffering time using a buffer size and a priority the master device sends. The master device, having the first priority, determines a buffering time depending on its own buffer size. For example, if the master device has a buffer size that is large enough to buffer streaming content for 10 seconds, the master device can determine a time range defined in a protocol with the streaming server 200 to receive corresponding sub-contents. For RTSP-based streaming, the master device fixes 0 to 10 seconds as a time range and then receives Real-Time Protocol (RTP) packets for 10 seconds among a streaming content the streaming server 200 transmits. Similarly, if the first slave device, having the second priority, has a buffer size to buffer streaming content for 5 seconds, the first slave device fixes 10 to 15 seconds as a time range defined in the RTSP play method for receiving a streaming content and then buffers corresponding sub-contents received for 5 seconds. The other slave devices can determine their own time ranges, depending on their priorities and buffer sizes, and then buffer corresponding sub-contents.

Accordingly, the master device assigns a larger buffering time to a later slave device, i.e., having lower priority. More specifically, if the buffering time of the Nth slave device is $T(n)$, the buffering time $T(n+1)$ of the (N+1)th slave device may be $T(n)$ plus a specific value (a). For example, assuming the buffering time of the first slave device is 5 seconds, if the above specific value (a) is 2 seconds, the buffering time of the second slave device is 7 seconds. Similarly, the buffering times of the third and fourth slave devices are 9 seconds and 11 seconds, respectively. Using the buffer size assigned by the master device, each portable device can calculate time intervals of sub-contents to be played. Therefore, each portable device can receive data to fill the buffer by using its own time interval and by regulating a range value. After buffering is completed, each slave device transmits the buffered data to the mater device through a short-distance communication network. Herein, in order to prevent a collision between transmitted data, the slave devices preferably transmit data in order of their priority.

When the playing of streaming content is stopped by a user interruption, the master device may send a stop instruction to the respective slave devices. If one of the slave devices receives a tear down message, corresponding to a stop instruction, from the streaming server, the master device receives the message from that slave device and sends it to the other slave devices. After receiving a stop instruction, the portable devices may disconnect a short-distance communication network by releasing pairing.

The control unit 170 of each portable device may negotiate a bandwidth for streaming from the streaming server 200 in consideration of its own remaining memory capacity. The master device has the greatest remaining memory capacity and receives the largest sub-contents, so a relatively greater bandwidth may be assigned to the master device.

As discussed above, when playing the multimedia content that the streaming server 200 provides in real-time, the master device repeatedly uses memories of some slave devices. Herein, while receiving and playing sub-contents that the last slave device buffers, the master device can buffer the next sub-contents by receiving them from the streaming server 200. At the same time, the slave devices can also receive and buffer their next assigned sub-contents.

Figure 3:
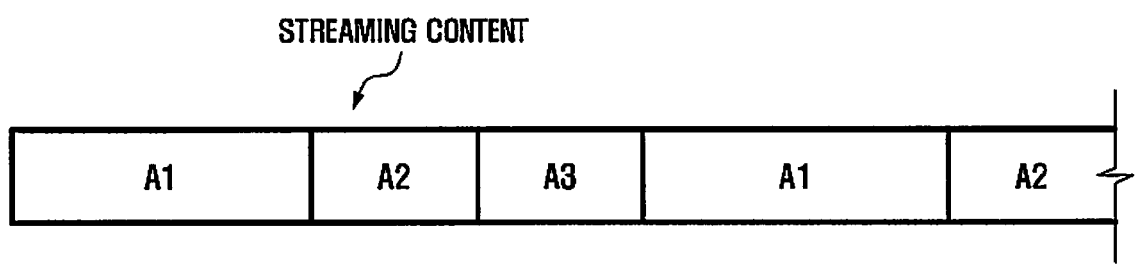
FIG. 3 illustrates the assignment of a streaming content to portable devices according to their buffer sizes in accordance with an embodiment of the present invention.

FIG. 3 illustrates an assignment of streaming content to portable devices according to their buffer sizes in accordance with an embodiment of the present invention. In the description of FIG. 3, it is assumed that three portable devices are used, the first portable device having the largest remaining memory capacity, and the third portable device having the smallest remaining memory capacity.

Referring to FIG. 3, reference character A1 indicates the size of sub-contents that the first portable device receives and buffers. The first size A1 corresponds to the remaining memory capacity or the buffer size of the first portable device. Similarly, reference character A2 indicates the size of sub-contents that the second portable device receives and buffers. The second size A2 corresponds to the remaining memory capacity or the buffer size of the second portable device. Also, reference character A3 indicates the size of sub-contents that the third portable device receives and buffers. The third size A3 corresponds to the remaining memory capacity or the buffer size of the third portable device.

With a menu for a distributed streaming service enabled, one of the three portable devices accesses the streaming server and selects a specific content to be streamed. Thereafter, that portable device establishes a short-distance communication network with the other portable devices, and receives information about the respective remaining memory capacities from the other portable devices. By comparing the remaining memory capacities A1, A2, and A3, the first portable device with the largest remaining memory capacity A1 is designated as the master device. The second and the third portable devices are designated as the slave devices.

Based on the remaining memory capacities A1, A2, and A3, the master device determines a buffer size and a priority of each device. Thereafter, the master device sends a buffer size and a priority to each slave device. Each portable device calculates its own buffering time using a buffer size and a priority. Then, based on a protocol, such as RTSP, each portable device receives sub-contents corresponding to its own buffering range. Accordingly, the entire streaming content illustrated in FIG. 3 is divided into consecutive parts A1, A2, and A3 of sub-contents, which are buffered in three portable devices, respectively. For example, the first sub-contents A1 is to be played from 0 second to 10 seconds, the second sub-contents A2 is to be played from 10 seconds to 15 seconds, and the third sub-contents A3 is to be played from 15 seconds to 18 seconds.

After enabling a play application program, the master device plays the first sub-contents A1. When playing of the first sub-contents A1 is almost completed, the master device starts to receive the second sub-contents A2 from the first slave device. That is, the first slave device buffers the second sub-contents A2 and starts to transmit them to the master device at a proper time (e.g., at 9 seconds) in consideration of the buffering time of the master device and the speed of a short-distance communication. Similarly, the second slave device starts to transmit the third sub-contents A3 to the master device at a proper time.

However, when playing of the third sub-contents A3 is almost completed, the master device starts to receive and buffer the fourth sub-contents A1 from the streaming server 200. If there remain fifth sub-contents following the fourth sub-contents, the first slave device starts to receive and buffer the fifth sub-contents in view of its buffering time. These processes are repeated until a stop instruction or message is received from a user or the streaming server 200.

Figure 4:
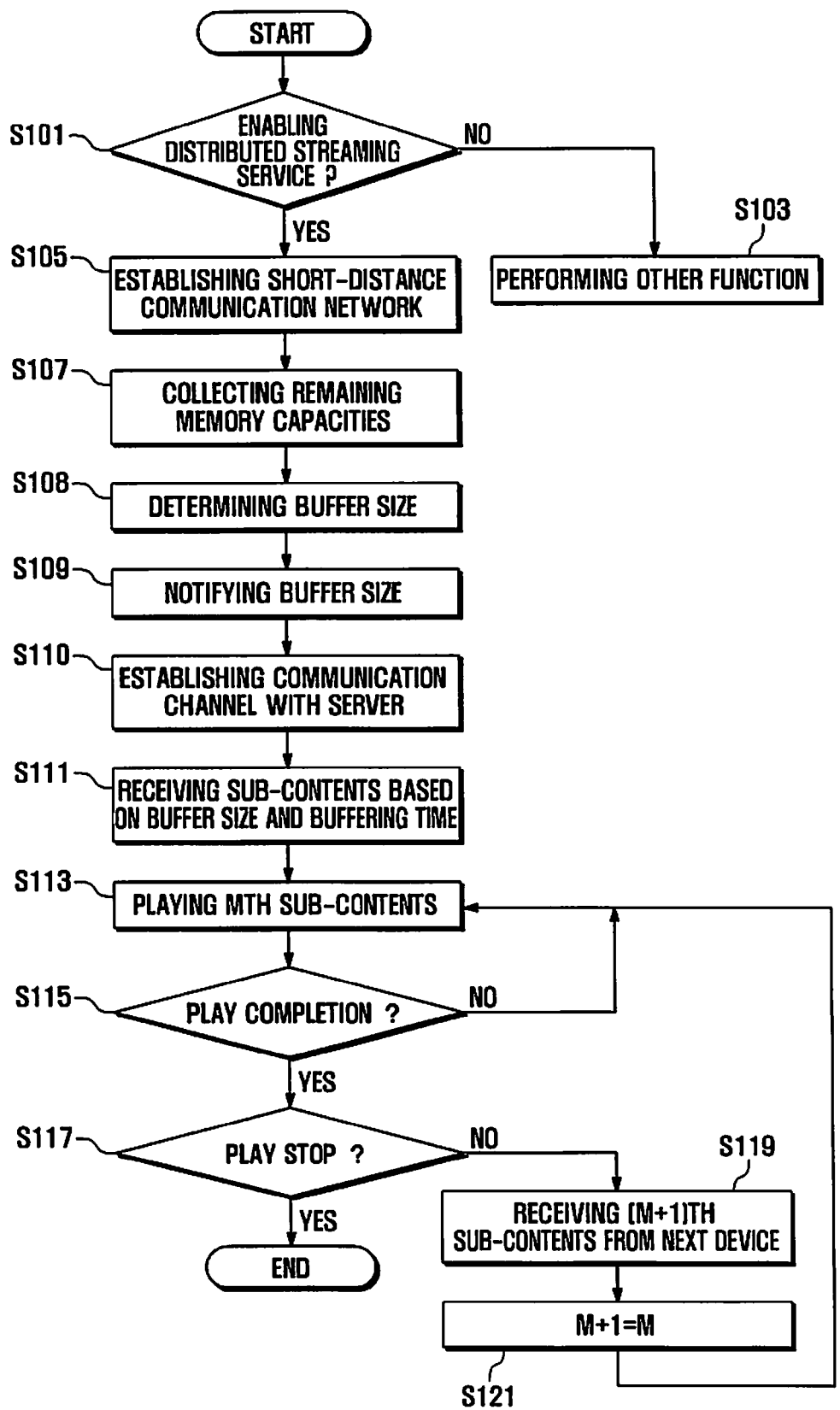
FIG. 4 is a flow diagram illustrating a method for a distributed streaming service of a master device in accordance with an embodiment of the present invention.
Figure 5:
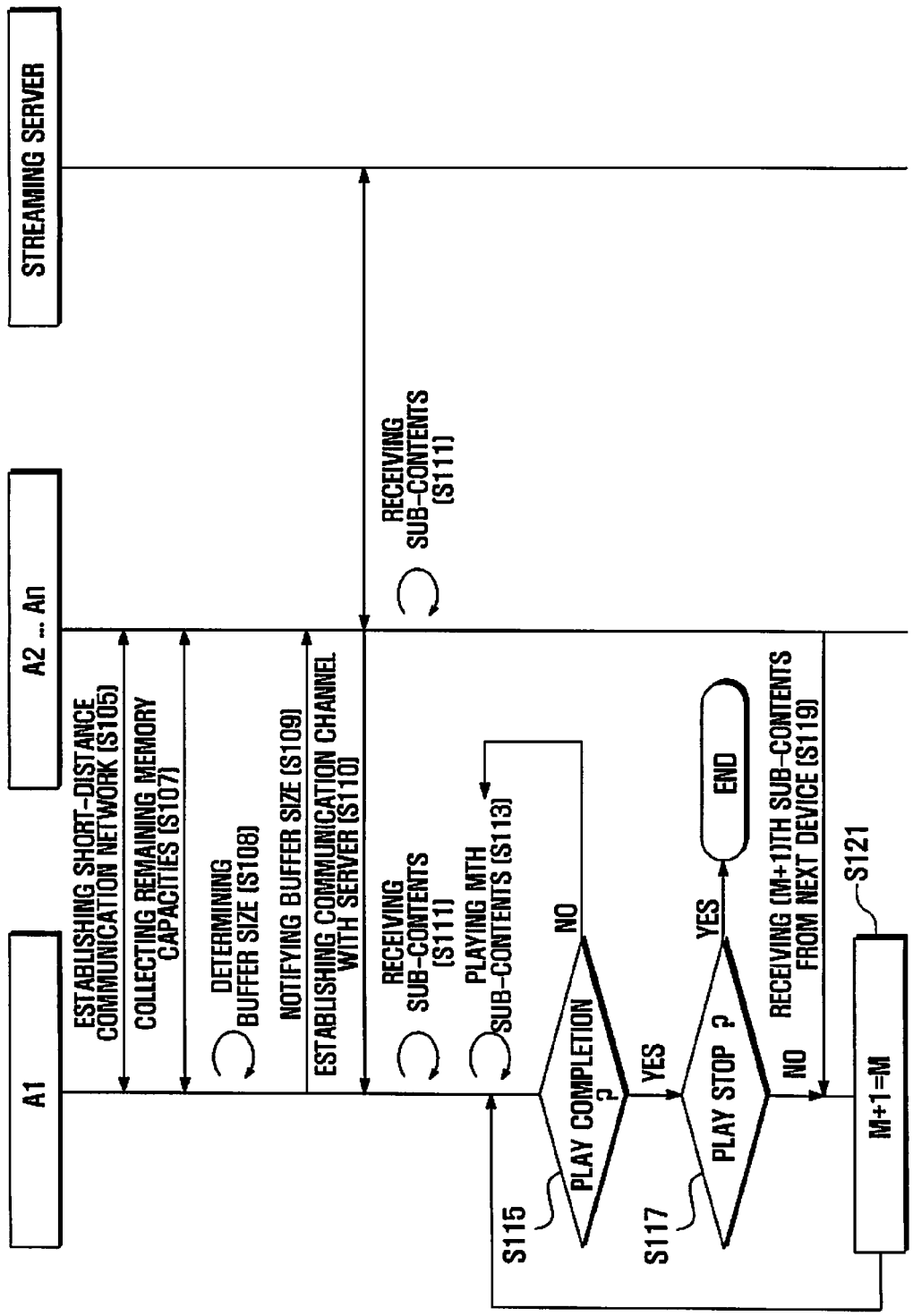
FIG. 5 is a flow diagram illustrating a method for a distributed streaming service of a system in accordance with an embodiment of the present invention.

FIG. 4 is a flow diagram illustrating a method for a distributed streaming service of a master device in accordance with an embodiment of the present invention, and FIG. 5 is a flow diagram illustrating a method for a distributed streaming service of a system in accordance with an embodiment of the present invention.

Referring to FIGS. 4 and 5, in step S101, each portable device determines if there is an input for using a distributed streaming service. Such an input may be a selection of a menu option for a distributed streaming service. If there is no input for a distributed streaming service, each portable device can perform any other functions such as a voice call, video call, a camera, etc., in step S103.

However, if one of the portable devices receives an input for a distributed streaming service, that portable device establishes a short-distance communication network with the other portable devices in step S105. That is, the input-received portable device performs a pairing process with the other portable devices, and therefore forming a service group having master-to-slave connections.

In step S107, the portable devices in the service group collect their remaining memory capacities. More specifically, the input-received portable device requests and collects the other portable device information about their remaining memory capacities. The input-received device compares all remaining memory capacities with each other, and, based on the comparison result, designates a portable device with the highest remaining memory capacity as a master device having the first priority. Thereafter, a control right of a short-distance communication network and information about remaining memory capacities are transferred to the master device. The master device designates, as the first slave device having the second priority, a portable device with the highest remaining memory capacity next to the master device. Similarly, the other portable devices are designated as slave devices with sequential priorities in order of their remaining memory capacities.

In step S108, the master device determines a buffer size of each slave device, depending on its remaining memory capacity. A buffer size is the size of a buffer that buffers, in real-time, streaming content transmitted by the streaming server. For example, if the master device has a remaining memory capacity for buffering a streaming content for 10 seconds, the first slave device has a buffer size for buffering a streaming content for less than 10 seconds.

When buffer sizes of all the portable devices are determined, the master device notifies each slave device of its buffer size in step S109. Then, each portable device calculates a buffering time, using buffer sizes, and establishes its own communication channel with the streaming server in step S110. The buffering time of a certain portable device is calculated in consideration of the buffer sizes of the portable devices with higher priorities and the speed of a short-distance communication.

After the buffering times of all the portable devices are calculated, each portable device receives and buffers its own sub-contents in step S111, based on the buffer size and the buffering time. Each portable device may regulate a time range in a specific protocol so as to receive sub-contents corresponding to its own buffering time.

When the master device buffers sub-contents corresponding to its own buffer size, the master device enables a play application program for playing the buffered sub-contents and controls the display unit to display the buffered sub-contents in step S113.

Hereinafter, sub-contents the master device plays will be referred to as the Mth sub-contents, where M is an arbitrary number representing the order of play. The master device plays the Mth sub-contents in step S113, and determines if the playing is completed in step S115. If the playing is not completed, the master device returns to step S113. However, if the playing is completed, the master device determines if a stop instruction is received in step S117.

If a stop instruction is not received, the master device starts to receive the next sub-contents, i.e., the (M+1)th sub-contents, from the next slave device in step S119. Thereafter, the master device regards the (M+1)th sub-contents as the Mth sub-contents in step S121, and plays the Mth sub-contents in step S113. In step S119, each slave device may transmit its own sub-contents to the master device in consideration of both buffering time and transmission time.

As described above, although the size of streaming content is greater than a sum of the buffer sizes of all the portable devices, the portable devices of the present invention can receive and play such a large-sized streaming content or a real-time broadcast content by repeatedly receiving sub-contents in order of a priority.

In a method and a system for a distributed streaming service according to the present invention, the amount assessed on sub-contents may be allotted equally or differentially to all the portable devices. Generally, the assessment of contents streaming may be defined by a service policy of the streaming server.

The present invention provides a method and a system for a distributed streaming service of portable devices belonging to a service group in a short-distance communication network, enabling each portable device to receive, based on its remaining memory capacity, sub-contents of a streaming content from a streaming server, and enabling a master device of portable devices to play contents by acquiring sub-contents from the other portable devices in a service group. Accordingly, the present invention may promote the efficiency of contents transmission, and also improve a degree of concentration during a play of contents.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for a distributed streaming service of portable devices including a master device and a slave device, the method comprising:
   determining, based on a remaining memory capacity of each of the portable devices, a buffer size and a priority of each of the portable devices;
   calculating, based on the buffer size and the priority of each of the portable devices, a buffering time of each portable device;
   receiving sub-contents of streaming content at the portable devices, each of the portable devices separately receiving different sub-contents simultaneously;
   buffering the received sub-contents for the buffering time calculated for each portable device; and
   playing the sub-contents at the master device.

2. The method of claim 1, wherein the streaming content is transmitted from a streaming server.

3. The method of claim 1, wherein the master device determines the buffer size and the priority of each of the portable devices.

4. The method of claim 1, wherein receiving the sub-contents comprises receiving next sub-contents at the portable devices, after a last slave device among the portable devices receives the sub-contents.

5. The method of claim 1, wherein determining the priority comprises assigning a higher priority to a portable device with a higher remaining memory capacity.

6. The method of claim 1, further comprising:
establishing a communication network between the portable devices;
collecting information about the remaining memory capacity of each of the portable devices; and
designating a portable device with a highest remaining memory capacity as the master device.

7. The method of claim 1, wherein calculating the buffering time is performed in consideration of the buffer sizes of the portable devices with relatively higher priorities and a time required to transmit the sub-contents to the master device.

8. The method of claim 1, wherein receiving the sub-contents comprises regulating a time range in a protocol defining the buffering time.

9. The method of claim 1, further comprising receiving, in the master device, sub-contents from the slave devices in order of priority.

10. The method of claim 9, wherein playing the sub-contents further comprises the master device receiving next sub-contents from a next portable device with a next highest priority, before the sub-contents of a specific portable device with a specific priority is completely played.

11. The method of claim 1, further comprising:
enabling the distributed streaming service at a first one of the portable devices;
accessing a streaming server at the first portable device; and
selecting specific streaming content in the streaming server.

12. A system for a distributed streaming service, the system comprising:
a plurality of portable devices for establishing a short-distance communication network, each of the portable devices calculating a buffering time for itself based on a buffer size and a priority, wherein the buffer size and the priority are determined by, and depend on, a remaining memory capacity of each of the portable devices, each of the portable devices buffering different sub-contents of streaming content for the buffering time calculated for itself; and
a streaming server for separately transmitting the sub-contents of the streaming content to each of the portable devices simultaneously.

13. The system of claim 12, wherein the portable devices comprise:
a master device having a greatest remaining memory capacity among the portable devices; and
at least one slave device for establishing a communication channel with the master device and receiving information about the buffer size and the priority from the master device.

14. The system of claim 13, wherein the master device comprises:
a first short-distance communication module for establishing a communication network;
a first Radio Frequency (RF) unit for receiving the sub-contents from the streaming server;
a first memory unit for temporarily storing the sub-contents;
a first display unit for displaying the sub-contents; and
a first control unit for controlling the first short-distance communication module, the first RF unit, the first memory unit, and the first display unit, and determining the buffer size and the priority of each of the portable devices, based on a remaining memory capacity of each of the portable devices.

15. The system of claim 14, wherein the slave device comprises:
a second short-distance communication module receiving the buffer size and the priority from the master device;
a second control unit calculating the buffering time from the buffer size and the priority;
a second RF unit receiving the sub-contents; and
a second memory unit temporarily storing the sub-contents for the buffering time.

16. The system of claim 14, wherein the first memory unit comprises a play application program available for playing the sub-contents.

17. The system of claim 16, wherein the first control unit controls, before the sub-contents of a specific portable device with a specific priority is completely played, to receive next sub-contents from a next portable device with a next highest priority.

18. The system of claim 15, wherein the first display unit displays the sub-contents in order of the priority of the portable device.

19. The system of claim 14, wherein the portable device receives next sub-contents, after a last slave device among the portable devices receives the sub-contents.

* * * * *